United States Patent [19]

Davoust et al.

[11] Patent Number: 4,660,436
[45] Date of Patent: Apr. 28, 1987

[54] VISCOUS VIBRATION DAMPERS

[75] Inventors: Joël Davoust, Lyons; Pascal Pelus, D'Ozon, both of France

[73] Assignee: Dampers S.A., Venissieux, France

[21] Appl. No.: 793,093

[22] Filed: Oct. 30, 1985

Related U.S. Application Data

[63] Continuation of Ser. No. 526,061, Aug. 24, 1983, abandoned.

[30] Foreign Application Priority Data

Aug. 24, 1982 [FR] France ................ 82 14534

[51] Int. Cl.⁴ .............................................. F16F 15/10
[52] U.S. Cl. ..................................... 74/574; 188/378; 464/180
[58] Field of Search ........................ 188/378; 464/180; 24/572, 574

[56] References Cited

U.S. PATENT DOCUMENTS

| | | | |
|---|---|---|---|
| 2,585,382 | 2/1952 | Guernsey | 74/574 |
| 3,285,097 | 11/1966 | O'Connor | 74/574 |
| 3,443,454 | 5/1969 | Hall | 74/574 |
| 3,555,926 | 1/1971 | Moorhouse et al. | 188/378 X |
| 3,603,172 | 9/1971 | Hall | 74/574 |
| 3,771,380 | 11/1979 | Bahr et al. | 74/574 |

FOREIGN PATENT DOCUMENTS

| | | |
|---|---|---|
| 0013129 | 7/1980 | European Pat. Off. . |
| 1232408 | 1/1967 | Fed. Rep. of Germany . |
| 1089018 | 9/1954 | France . |
| 1240947 | 8/1960 | France . |
| 1576137 | 7/1969 | France . |
| 2015159 | 4/1970 | France . |
| 2033942 | 12/1970 | France . |

Primary Examiner—George E. A. Halvosa
Attorney, Agent, or Firm—Shoemaker and Mattare, Ltd.

[57] ABSTRACT

A viscous vibration damper for a rotary shaft comprising an annular casing of stamped sheet metal and an endplate. The endplate comprises an inner annular hub portion for mounting the damper on the rotary shaft and an outer annular cover portion for closing the open end of the casing. The casing has an inner peripheral wall will a free end having an abutment zone for axial alignment of the casing on the endplate and a cylindrical surface cooperable with a cylindrical shoulder between the hub portion and the cover portion of the endplate for radial alignment of the casing. An inner annular weld is provided adjacent the resulting annular joint at the free end of the inner peripheral wall. An annular joint is also provided at the free end of the outer peripheral wall for axial alignment at the outer periphery of the cover portion and optionally for radial alignment. An annular weld seals the outer joint.

4 Claims, 4 Drawing Figures

VISCOUS VIBRATION DAMPERS

This is a continuation, of application Ser. No. 526,061, filed Aug. 24, 1983, now abandoned.

BACKGROUND OF THE INVENTION

The present invention relates to viscous vibration dampers mounted on a rotary shaft for damping torsional vibrations.

Such viscous vibration dampers comprise an inertia ring enclosed in an annular housing filled with a viscous liquid, clearance being provided between the inertia ring and the annular housing; a mounting hub provides the connection between the housing and the rotary shaft. The present invention is directed more particularly to the overall structure of the housing and mounting hub.

DESCRIPTION OF THE PRIOR ART

In one conventional construction the viscous vibration damper comprises an open-ended annular casing and an annular plate closing off the open end of the annular casing. The annular casing and plate are secured together by crimping or threaded fasteners, for example, to define a toroidal chamber having dimensions slightly greater than that of the inertia ring adapted to be received therein. The resulting housing is filled with a viscous fluid having viscous and elastic properties adapted to optimize the damping of torsional vibrations applied to the housing by shearing the viscous fluid in the relatively narrow clearance space between the inertia ring and the housing. The greater the mass of the inertia ring is with respect to that of the housing, the better the damping. Hence the inertia ring is made of a material having the highest possible density.

To prevent direct contact between the inertia ring and the housing low friction pad or bushes (for example of fiber, bronze or tetrafluoroethylene) are generally disposed therebetween.

In a first known vibration damper structure the hub for mounting the housing of the damper on the rotary shaft is integral with the annular casing. The resulting structure of the housing and the hub is relatively complicated. In practice the fabrication of the annular casing and the mounting hub require foundery work, forging or presswork and it is common for the ultimate weight of the housing after machining to be only one-third of the starting workpiece which means a loss of two-thirds of the weight of the starting workpiece.

According to the torsion vibration damper of U.S. Pat. No. 3,771,380 the hub is defined by two radially inwardly extending axially superposed plates integral with the casing and the annular endplate respectively. The manufacture of this damper construction is substantially facilitated with respect to the above-described first known damper structure inasmuch as the parts can be made by the relatively simple operations of stamping or hydroforming.

French patent publication No. 2,033,942 (based on U.S. Ser. No. 796,461 filed Feb. 4, 1969) discloses, inter alia, a relatively simplified damper construction wherein the annular casing is devoid of any radially inwardly projecting flange; as a result there is reduced structural integrity of the mounting hub which is defined by the radially inwardly extending portion of the endplate as well as an inferior quality sealing particularly at the inner weld.

Taking into account the increasingly high rotational speeds to which such viscous vibration dampers are subjected, it is not critical to provide precision dynamically balanced structures lest unacceptable wobble may occur, related notably to want of centering of the annular casing, and therefore of the inertia ring relative to the rotary shaft, tending to bend the shaft and reduce its service life. And the stamping operations do not permit very close tolerances to be attained.

SUMMARY OF THE INVENTION

According to the invention there is provided a viscous vibration damper satisfying requirements of structural rigidity and fluidtightness while being easy to manufacture, assembly and dynamically balance.

In accordance with the invention there is provided a viscous vibration damper adapted to be mounted on a rotary shaft for damping torsional vibrations thereof. The viscous vibration damper is of the type comprising a housing including an open-ended annular casing of stamped sheet metal construction and an annular endplate defining a hub for mounting on the rotary shaft. An inertia ring is enclosed inside the housing and low friction pads or bushes are interposed between the inertia ring and the housing. The housing is filled with a viscous fluid. A reservoir for the viscous fluid is defined radially inwardly of the inertia ring. This viscous vibration damper according to the invention is characterized by the inner peripheral wall of the casing having a step for stiffening the same and forming small diameter wall portion for defining the reservoir with the inertia ring. A cylindrical shoulder is formed between the hub portion and the cover portion of the endplate. An abutment zone is formed at the free end of the inner peripheral wall for axial abutment with a portion of the endplate adjacent the cylindrical shoulder, and a cylindrical bearing surface is formed at the free end of the inner peripheral wall substantially equal in diameter to the cylindrical shoulder for radial alignment of the casing on the endplate. The outer peripheral wall also includes a free end having an abutment zone for axial abutment against a peripheral zone of the cover portion. An inner annular weld is provided between the inner peripheral wall and that portion of the endplate adjacent the cylindrical shoulder and an outer annular weld is provided between the free end of the outer peripheral wall and the outer peripheral zone of the cover portion.

Such a damper may be manufactured with relatively simple operations of stamping the annular casing and machining (if necessary) the cylindrical bearing surface thereon, and cutting out and machining the bearing surfaces of the endplate. Accordingly the loss of material of the starting workpiece is less than 25%. Further, owing to the cylindrical bearing surfaces on the annular casing and endplate the centering of the casing on the endplate is relatively easy and ensures good dynamic balancing while improving the degree of fluidtightness at the radially inner weld between the casing and the endplate. Finally, the smaller diameter wall portion of the stepped inner peripheral wall not only defines the viscous fluid reservoir but also stiffens the annular casing.

BRIEF DESCRIPTION OF THE DRAWINGS

These and other features and advantages of the invention will become apparent from the description which follows, given by may of example, with reference to the accompanying drawings.

DESCRIPTION OF A PRIOR ART CONSTRUCTION

Figure 1:
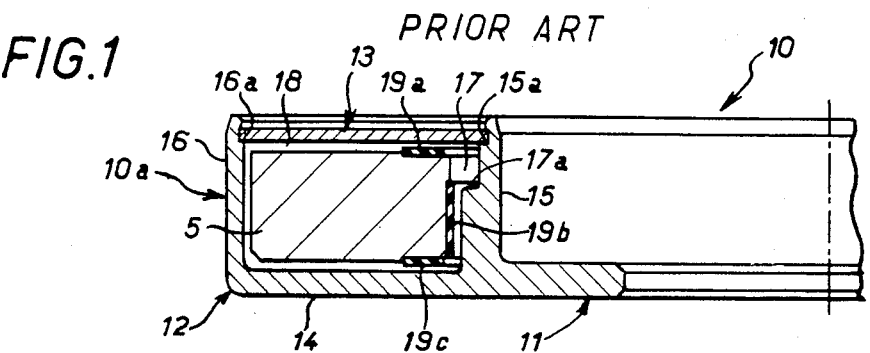
FIG. 1 is a longitudinal sectional view of one-half of a prior art viscous vibration damper.

Each of the viscous vibration dampers illustrated in FIGS. 1-4 is adapted to be fixed to a rotary shaft which for the sake of simplification of the drawings is not illustrated but only represented by a chain-dotted line corresponding to the axis of the rotary shaft.

All the illustrated vibration dampers comprise an annular housing having a hub for securement by suitable means (not shown) to the associated rotary shaft. Conventionally an inertia ring 5 of generally rectangular cross section and coaxial with the rotary shaft is received in the chamber defined by the housing which is filled with a viscous fluid 18 such as silicone. The inertia ring 5 is kept out of direct contact with the interior walls of the housing by means of low friction pads or bushes of felt, bronze or synthetic plastic material. There are three such bushes or pads 19a, 19b and 19c. Two of the pads or bushes 19a, 19c are annular and disposed on axially opposed ends of the inertia ring 5, and the third pad or bush 19b is cylindrical and disposed along a substantial portion of the inner cylindrical wall of the inertia ring 5. The chamber is filled with the viscous fluid through a port (not illustrated). Typically there is provided a reservoir 17 for viscous fluid formed radially inwardly of the inertia ring 5, to compensate for changes in volume of the viscous fluid. When the damper rotates the inertia ring 5 is maintained in contact with the viscous fluid along its entire surface by centrifugal force. The space between the inertia ring 5 and the housing, filled with the viscous fluid, is typically small and of constant volume.

As an example of the prior art, FIG. 1 illustrates a damper 10 of the foregoing type comprising a housing 10a having an open-ended generally toroidal annular casing 12 and a flat annular cover 13. The housing 10a is adapted to be mounted for rotation on an associated rotary shaft by means of a hub 11 which is integral with the casing 12. The annular casing 12 comprises an endwall 14 which is the continuation of the hub 12 but of lesser thickness and which joins the inner and outer peripheral walls 15 and 16. The inner and outer peripheral walls 15 and 16 of the annular casing 12 have shoulders 15a and 16a, respectively, against which sealingly bear a cover 13 when assembled by appropriate means (not shown) with the annular casing 12. The inner peripheral wall 15 of the casing 12 also comprises a viscous liquid reservoir 17 formed by a stepback defined by a shoulder 17a between portions of the inner peripheral wall of different wall thickness.

Such a damper comprising a hub 11 and an annular housing 10a is relatively complicated to manufacture owing to the various changes in the wall thickness which require expensive foundry, forging or press work before finishing machining.

DESCRIPTION OF THE PREFERRED EMBODIMENTS

Figure 2:
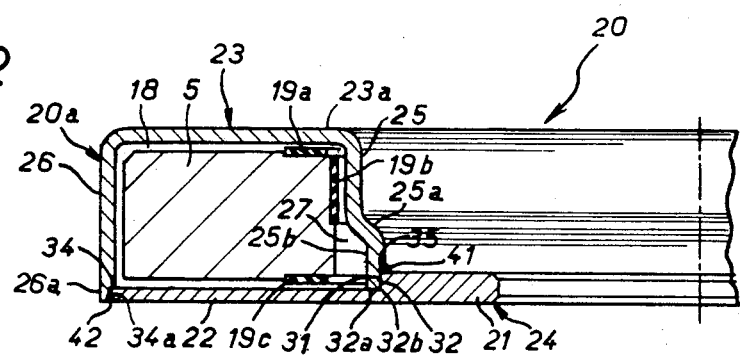
FIG. 2 is a longitudinal sectional view of one-half of a viscous vibration damper according to a first embodiment of the invention.

FIG. 2 illustrates a first embodiment of the viscous vibration damper 20 comprising a housing 20a, a hub portion 21 adapted to mount the entire damper on an associated rotary shaft. The housing 20a comprises an open-ended annular casing 23 of generally U-shaped section which is closed by a cover portion 22 which is an integral part of an endplate 24. The endplate 24 thus comprises two concentric portions, a radially inner hub portion 21 and a radially outer cover portion 22. Accordingly the housing 20a is secured to the associated rotary shaft by means of an endplate 24 which also defines the portion 22 of the casing 23 rather than an integral part of the annular casing, as in the case of the prior art damper of FIG. 1.

The casing 23 is of stamped sheet metal. It comprises an endwall 23a joining the inner cylindrical peripheral wall 25 to the outer cylindrical peripheral wall 26. The inner peripheral wall 25 comprises an inclined step 25a dividing it into a radially inner, or small diameter, wall portion and a radially outer or large diameter wall portion. The radially inner wall portion adjoins the free end 25b of the inner peripheral wall 25 and defines a viscous liquid reservoir 27 with the radially inner side of the inertia ring 5. Further, the step 25a stiffens the inner peripheral wall 25. Also, as the casing 23 is of stamped sheet metal it has a substantially constant thickness which permits heat generated in the viscous liquid to be uniformly dissipated to the surroundings.

The small diameter wall portion 25b of the inner peripheral wall 25 of the casing 23 has a cylindrical bearing surface 32 and an adjoining transverse abutment zone 32a terminating in a circular edge 32b.

The endplate 24 has a cylindrical centering shoulder 31 at the boundary between the inner annular hub portion 21 and the surrounding annular cover portion 22. The cover portion 22 has a wall thickness less than that of the hub portion 21 and preferably equal to that of the casing 23 so that heat generated during the damping of torsional vibrations is uniformly dissipated through wall of the cover portion 22 as well as that of the casing 23. It is to be noted that the endplate 24 with its cover portion 22 and hub portion 23 of different thicknesses can be simply fabricated by blanking and machining on a lathe.

Cylindrical shoulder 31 is in snug engagement with the cylindrical bearing surface 32 at the small diameter wall portion 25b of the inner peripheral wall 25 of casing 23. This arrangement has a dual functions:

(1) It ensures centering of the casing 23 on the endplate 24 overcoming any possible want of cylindricality of the cylindrical bearing surface 32 resulting from the stamping of the casing.

(2) It improves the fluidtightness of the triangular inner annular weld 41 between the casing 23 and the endplate 24 to the extent that the transverse abutment surface 32a abuts axially against the cover portion 22 of the endplate 24 and the cylindrical bearing surface 32 abuts radially against the cylindrical shoulder 31.

In the FIG. 2 embodiment the transverse edges of the free ends of the inner and outer peripheral walls 25 and 26 are annularly notched to define an inner annular shoulder 35 and an outer annular shoulder 34 abutting axially against the hub portion 21 and the cover portion 22 respectively. Accordingly, the free end of the inner peripheral wall 25 has two axial abutment zones, one on each side of the cylindrical bearing zone, i.e., one on the hub portion 21 and the other on the cover portion 22. This ensures improved fluidtightness. The free end 26a of the outer peripheral wall 26 extends around the free edge 34a of the endplate 24 and engages the latter for centering the outer peripheral wall 26, ensuring fluidtightness in association with V-shaped outer annular weld 42.

Figure 3:
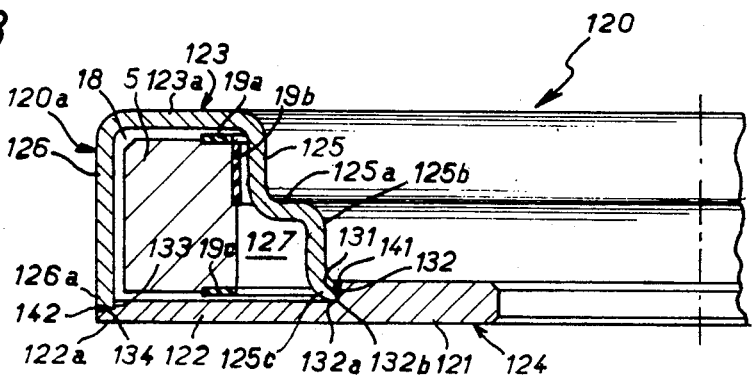
FIG. 3 is a view similar to that of FIG. 2 for another embodiment of the viscous vibration damper according to the invention.
Figure 4:
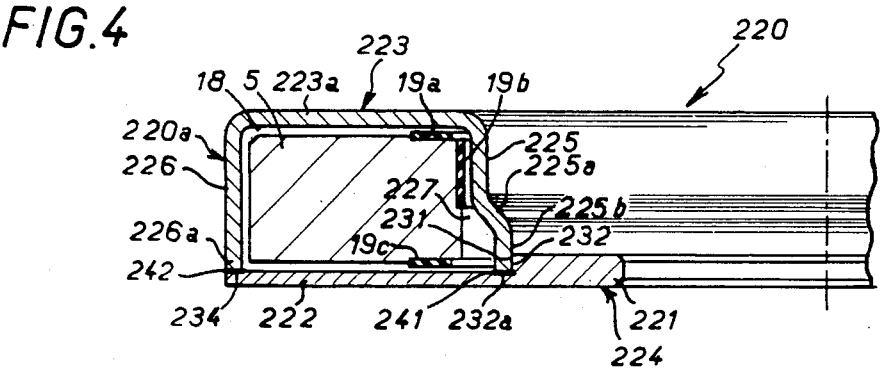
FIG. 4 is a view similar to that of FIG. 2 for another embodiment of the viscous vibration damper according to the invention.

The embodiments of FIGS. 3 and 4 are similar to that of FIG. 2, like parts in FIG. 3 are designated by the same reference numerals increased by 100 and like parts in FIG. 4 are designated by reference numerals increased by 200.

In the FIG. 3 embodiment there is shown a viscous vibration damper 120 comprising a housing 120a includes an open-ended annular casing 123 and a cover portion 122, and a hub portion 121 for mounting the damper 120 on a rotary shaft. The casing 123 comprises an inner peripheral wall 126 having a free end 126a and an inner peripheral wall 125 having a step 125a between a larger diameter wall portion 125b and a smaller diameter wall portion and a flat annular endwall 123a joining the inner and outer peripheral walls 125 and 126. It is noted that the step 125a is generally flat, i.e., it lies in a plane perpendicular to the axis of the damper, unlike the step 25a of FIG. 2 which is inclined. Such a step 125a requires greater stamping forces but produces a more rigid casing structure.

The free end 125b of the inner wall portion 125a has a radially inturned portion 125c with a cylindrical transverse edge 132 which is in snug engagement with the cylindrical shoulder 131 on the hub portion 121. The inner annular weld 141 of V-section is interiorly contained and is formed between the cylindrical edge 132 and the cylindrical shoulder 131. Abutment zone 132a on the radially inturned portion 125c bears axially against the cover portion 122 adjacent the hub portion 121. Circular edge 132b is defined at the intersection of the shoulder 131 and the inner surface of the cover portion 122 of the endplate. Circular edge 132b and abutment zone 132a together locate the inner peripheral wall 125 axially and radially relative to the endplate 124.

The free end 126a of the outer peripheral wall 126 bears through an abutment zone 134 axially against an annularly notched peripheral zone 122a of the cover portion 122 and radially against the annular shoulder 133 formed between the annularly notched peripheral zone 122a and the radially inwardly adjacent main part of the cover portion 122. The outer annular weld 142 of V-section is formed between the transverse edge of the free end 126a and the annularly notched peripheral zone 122a. Once again this arrangement provides good centering of the casing 123 on the endplate 124 as well as good fluidtightness at the inner and outer annular welds 141 and 142.

FIG. 4 illustrates a third viscous vibration damper 220 embodying the present invention, comprising a housing 220a including an open-ended annular casing 223 and a cover portion 222, and a hub portion 221 for mounting the damper 220 on a rotary shaft (not shown). The casing 223 comprises an inner peripheral wall 225 having an inclined step 225a, as in the FIG. 2 embodiment, between a larger diameter wall portion and a smaller diameter wall portion 225b and a flat annular endwall 223a joining the inner and outer peripheral walls 225 and 226.

The joints between the casing 223 and the endplate 224 in FIG. 4 are simplified over the FIGS. 2 and 3 embodiments. Indeed the free ends 225b and 226a are simply squared off and are unnotched. Likewise the peripheral zone of the cover portion 222 is of the same thickness as the rest of the cover portion 222. The smaller diameter portion 225b of the inner peripheral wall 225 has a cylindrical free end 232 in engagement with the cylindrical shoulder 231 on the hub portion 221 for centering or aligning the casing 223 radially with respect of the endplate 224. The free end of the inner peripheral wall 225 has a transverse edge defining an abutment zone 232a bearing axially against the inner surface of the cover portion 222 adjacent the shoulder 231 on the hub portion 224. The free end of the outer peripheral wall 226 has a transverse edge defining an abutment zone 234 bearing axially against the peripheral zone of the cover portion 222 of the endplate 224. The abutment zones 232a and 234 thus together define the axial position of the casing 223 on the endlate 224. A flat annular outer weld 242 is formed between the transverse edge of the outer peripheral wall 226 and the facing peripheral zone of the cover portion 222. A flat annular inner weld 241 coplanar with the outer weld 242 is formed between the transverse edge of the inner peripheral wall 225 and the facing abutment zone of the cover portion 222 immediately outwardly adjacent the hub portion 221.

Two different types of welding may be used to produce the inner and outer annular welds between the casing and the endplate. First of all, vacuum electron bombardment is preferred which has the advantage of welding between contact surfaces which are not directly accessible from the exterior such as welds 241 and 242 in FIG. 4. Electron bombardment welding has the further advantage of permitting the use of light metal alloys, for example of aluminum, for the casing and endplate instead of being limited to steel. As a result the damping capacity of the damper can be substantially increased for a given damping mass since the inertia ring can be relatively heavier. Another welding method is by means of a high energy pulse generator with a condenser.

The present invention results in a substantial simplification of the damper structure with a corresponding reduction in the manufacturing and assembly costs of the component parts of the damper, while maintaining high standards of rigidity, fluidtightness and dynamic balance. It will also be noted that the damper structure according to the invention enables greater dimensional tolerances to be adopted which are necessary when employing a stamped casing. Tetrafluoroethylene low friction bushes or pads are recommended inasmuch as this material compensates for any surface irregularities on the inner wall surfaces of the casing.

Finally, the present invention is not intended to be limited to the illustrated and described embodiments, and those skilled in the art will understand that various modifications and alternatives may be incorporated without departing from the spirit and scope of the present invention. In particular if desired the inner joint or outer joint of one of the illustrated embodiments may be substituted by the corresponding inner or outer joint of another of the embodiments.

What we claim is:

1. A viscous vibration damper for damping torsional vibrations of a rotary shaft, the vibration damper comprising an annular endplate including an inner annular hub portion adapted to be mounted on the rotary shaft, and an outer annular cover portion, an open-ended annular casing of stamped sheet metal having inner and outer peripheral walls, said cover portion closing off the open end of said casing and defining therewith a housing accommodating an inertia ring having low friction bushes or pads and containing a viscous fluid, the inner peripheral wall of said casing having a step for stiffening the same and forming a small diameter wall portion adjacent said endplate defining a viscous fluid reservoir for said viscous fluid, said step of said inner peripheral wall of said casing lying in a plane perpendicular to the axis of the vibration damper and separating the inner peripheral wall into said small diameter wall portion and a slightly larger diameter wall portion, a cylindrical shoulder being formed between said hub portion and said cover portion of said endplate, an abutment zone being formed on the free end of said inner peripheral wall for axial abutment with a portion of said endplate adjacent said cylindrical shoulder and a cylindrical bearing surface formed at the free end of said inner peripheral wall substantially equal in diameter to and cooperable with said cylindrical shoulder for radial alignment of said casing on said endplate, said free end of said inner peripheral wall comprising a radially inturned portion, said cylindrical bearing surface on said free end of said inner peripheral wall being formed on the transverse edge of said free end and said abutment zone on said free end of said peripheral wall, said radially inturned portion adjoining said transverse edge, said outer peripheral wall including a free end having an abutment zone for axial abutment against an outer peripheral zone of said cover portion, an inner annular weld being provided between said free end of said inner peripheral wall and said portion of said endplate adjacent said cylindrical shoulder and an outer annular weld being provided between said free end of said outer peripheral wall and said outer peripheral zone of said cover portion.

2. The vibration damper according to claim 1, wherein the abutment zone on said outer peripheral wall is formed by a transverse edge for axial abutment with an annularly notched peripheral zone of said cover portion, a cylindrical shoulder adjoining said annularly notched peripheral zone providing radial alignment of said outer peripheral wall relative to said endplate.

3. The vibration damper according to claim 1, wherein said casing and said endplate are made of light metal alloy.

4. The vibration damper according to claim 1, wherein said low friction bushes or pads are made of tetrafluoroethylene.

* * * * *